United States Patent
Schneider

(10) Patent No.: US 11,851,025 B2
(45) Date of Patent: Dec. 26, 2023

(54) VEHICLE CAB ACCESS ASSEMBLY

(71) Applicant: Kent Schneider, Taylorsville, KY (US)

(72) Inventor: Kent Schneider, Taylorsville, KY (US)

(*) Notice: Subject to any disclaimer, the term of this patent is extended or adjusted under 35 U.S.C. 154(b) by 81 days.

(21) Appl. No.: 17/404,003

(22) Filed: Aug. 17, 2021

(65) Prior Publication Data

US 2023/0057375 A1 Feb. 23, 2023

(51) Int. Cl.
*B60R 3/00* (2006.01)

(52) U.S. Cl.
CPC .............. *B60R 3/002* (2013.01); *B60R 3/007* (2013.01)

(58) Field of Classification Search
CPC ................................ B60R 3/002; B60R 3/007
See application file for complete search history.

(56) References Cited

U.S. PATENT DOCUMENTS

| | | | | |
|---|---|---|---|---|
| 4,071,260 A | | 1/1978 | Marshall | |
| 4,991,906 A | * | 2/1991 | Fingerle | B62D 33/0612 296/180.2 |
| 5,538,265 A | * | 7/1996 | Chen | B60R 3/02 280/166 |
| 5,584,493 A | * | 12/1996 | Demski | B60R 3/02 105/445 |
| 6,178,364 B1 | * | 1/2001 | Delurey | B60R 3/02 280/166 |
| 6,179,312 B1 | * | 1/2001 | Paschke | E06C 7/003 182/127 |
| 6,264,222 B1 | * | 7/2001 | Johnston | B60R 3/02 182/127 |
| 6,817,433 B1 | * | 11/2004 | Bergstrom | B62D 25/105 180/89.12 |
| 6,971,657 B2 | * | 12/2005 | King | B60R 3/00 182/127 |
| 8,042,820 B1 | * | 10/2011 | Dewees | B60R 3/02 280/166 |
| 9,233,722 B1 | * | 1/2016 | Bixby | B60R 3/00 |
| 9,550,458 B2 | | 1/2017 | Smith | |
| 11,254,265 B2 | * | 2/2022 | Miller | B60R 3/02 |
| 2008/0129079 A1 | * | 6/2008 | Plett | B62D 25/24 296/146.5 |
| 2010/0301580 A1 | * | 12/2010 | Stahl | B60R 3/00 280/166 |
| 2013/0154229 A1 | * | 6/2013 | Kim | B60R 3/02 280/163 |

* cited by examiner

*Primary Examiner* — Bryan A Evans

(57) ABSTRACT

A vehicle cab access assembly for easier and safer egress and ingress includes a step fairing, which is mountable to a respective side of a vehicle, such as a cab over engine vehicle, so that the step fairing is positioned below a door positioned in a cab of the vehicle. The step fairing comprises three steps and facilitates egress and ingress to the cab of the vehicle.

12 Claims, 4 Drawing Sheets

VEHICLE CAB ACCESS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to access assemblies and more particularly pertains to a new access assembly for easier and safer egress and ingress. The present invention discloses an access assembly for a cab over engine vehicle comprising a step fairing having three fixed three steps.

(2) Description of Related Art Including Information Disclosed Under 37 CFR 1.97 and 1.98

The prior art relates to access assemblies. Prior art access assemblies may comprise hydraulic lifts, retractable steps, folding steps, and fixed staircases comprises two steps. What is lacking in the prior art is an access assembly for a cab over engine vehicle comprising a step fairing having three fixed three steps.

BRIEF SUMMARY OF THE INVENTION

An embodiment of the disclosure meets the needs presented above by generally comprising a step fairing, which is configured to be mountable to a respective side of a vehicle, such as a cab over engine vehicle, so that the step fairing is positioned below a door positioned in a cab of the vehicle. The step fairing comprises three steps and is configured to facilitate egress and ingress to the cab of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
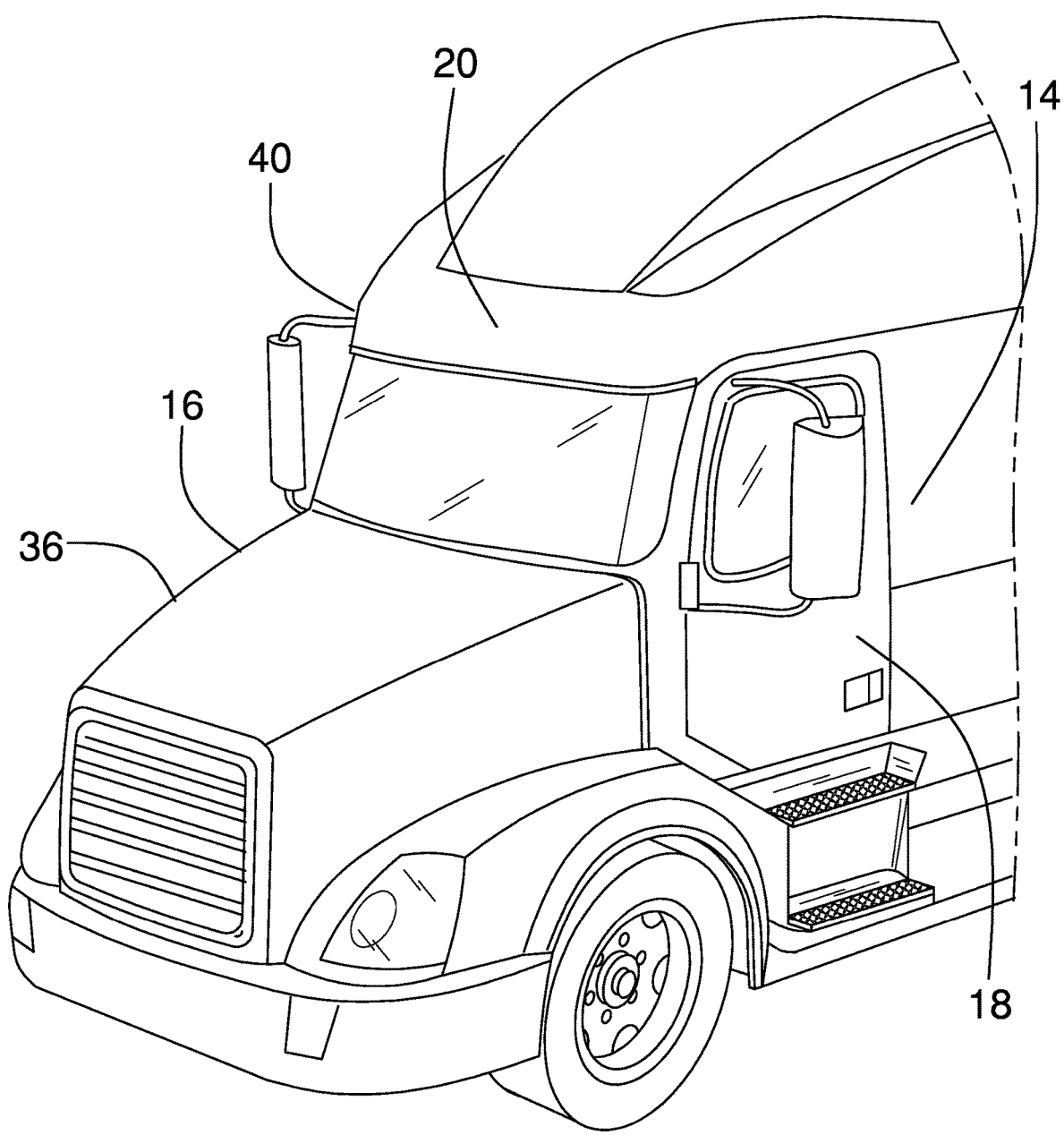
FIG. 1 is an isometric perspective view of a prior art vehicle cab access assembly.

With reference now to the drawings, and in particular to FIGS. 1 through 4 thereof, a new access assembly embodying the principles and concepts of an embodiment of the disclosure and generally designated by the reference numeral 10 will be described.

Figure 2:
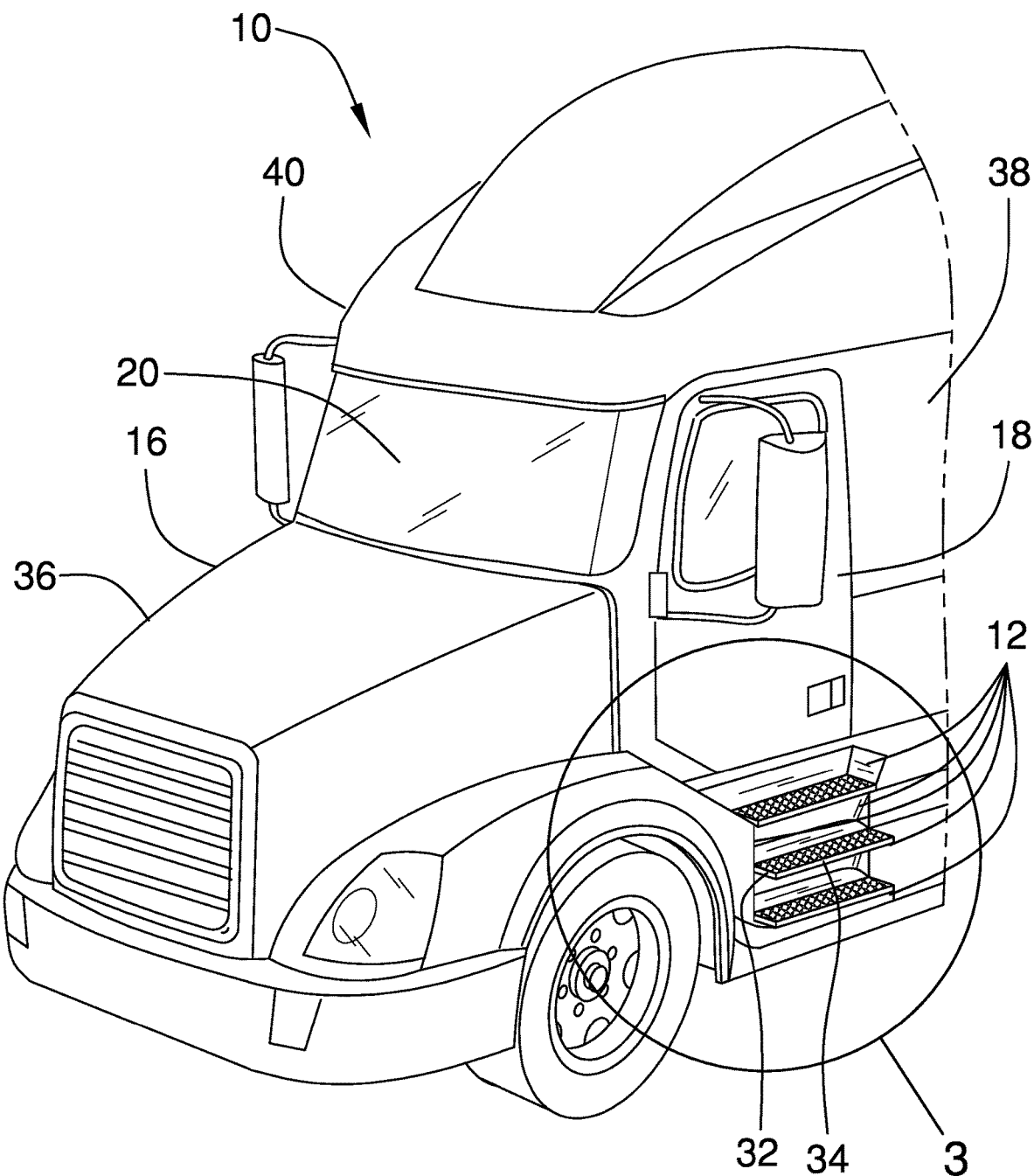
FIG. 2 is an isometric perspective view of according to an embodiment of the disclosure.

As best illustrated in FIGS. 1 through 4, the vehicle cab access assembly 10 generally comprises a step fairing 12, which is configured to be mountable to a respective side 14 of a vehicle 16 so that the step fairing 12 is positioned below a door 18 positioned in a cab 20 of the vehicle 16. The step fairing 12 comprises three steps 22 and is configured to facilitate egress and ingress to the cab 20 of the vehicle 16. Prior art access assemblies generally comprise two steps 22, as shown in FIG. 1, which are difficult to ascend and descend, particularly for older drivers or drivers who are physically impaired, such as drivers suffering from arthritis. In contrast, the step fairing 12, once installed, provides three steps 22, as shown in FIG. 2, and is easier to ascend and descend.

Each step 22 comprises a pair of side panels 24, a tread rung 26, and a riser 28. The tread rungs 26 are grated, as shown in FIG. 2, or slotted (not shown) and thus are configured to be slip resistant and to prevent of accumulation of foreign materials. The side panels 24 and the risers 28 comprise metal or plastic. The tread rungs 26 comprise metal.

The step fairing 12 is configured so that, upon mounting of the step fairing 12 to the respective side 14 of the vehicle 16, a bottommost tread rung 30 is positioned no more than 609 millimeters above a surface upon which the vehicle 16 is positioned. Each tread rung 26 has a depth 32 of at least 12.7 centimeters. The depths 32 of the tread rungs 26 may be substantially equivalent, although the present invention also anticipates the depths 32 of the tread rungs 26 being nonequivalent. Each tread rung 26 has a width 34 of at least 25.4 centimeters. The widths 34 of the tread rungs 26 may be substantially equivalent, although the present invention also anticipates the widths 34 of the tread rungs 26 being nonequivalent.

Figure 3:
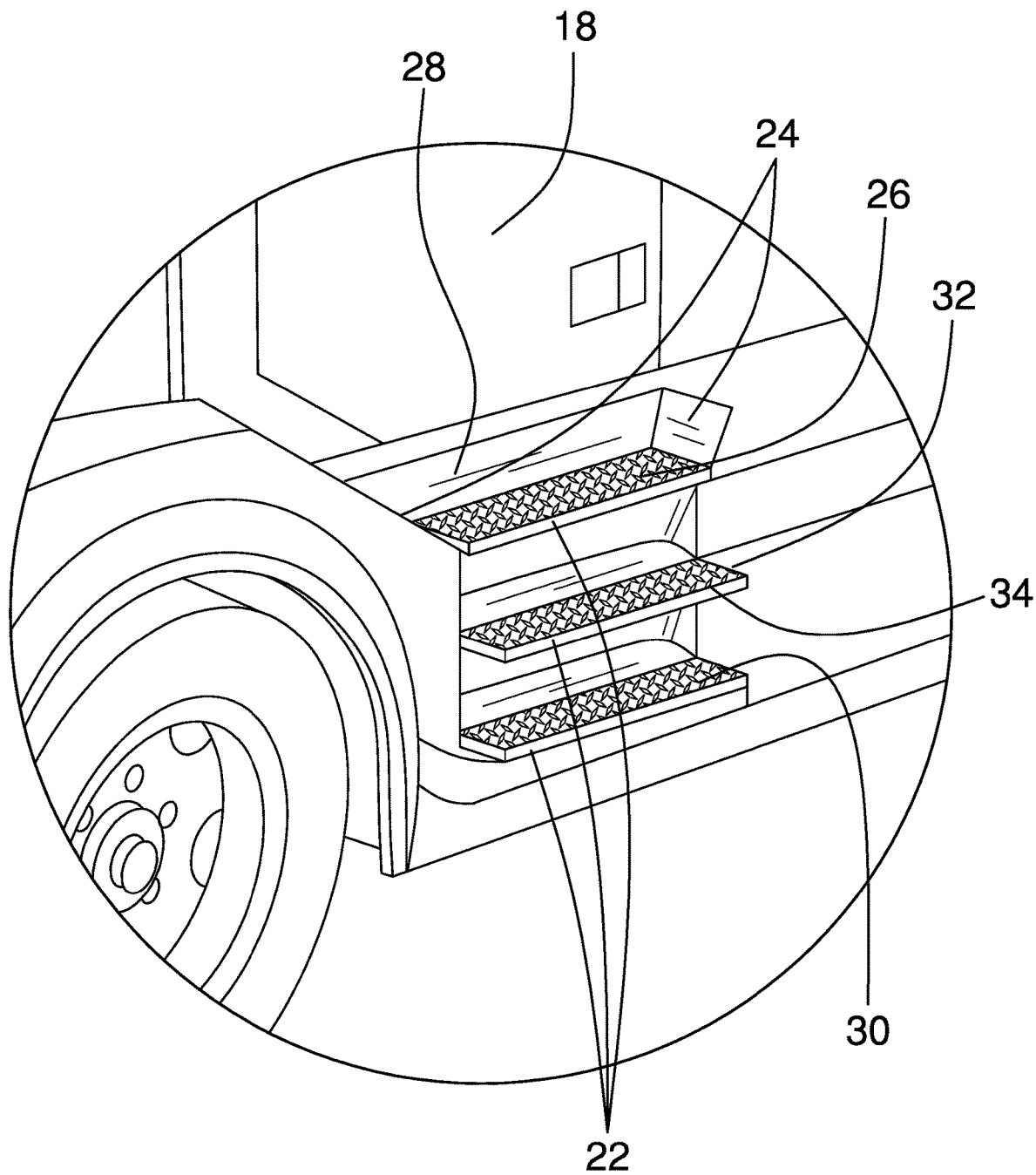
FIG. 3 is a detail view of an embodiment of the disclosure.
Figure 4:
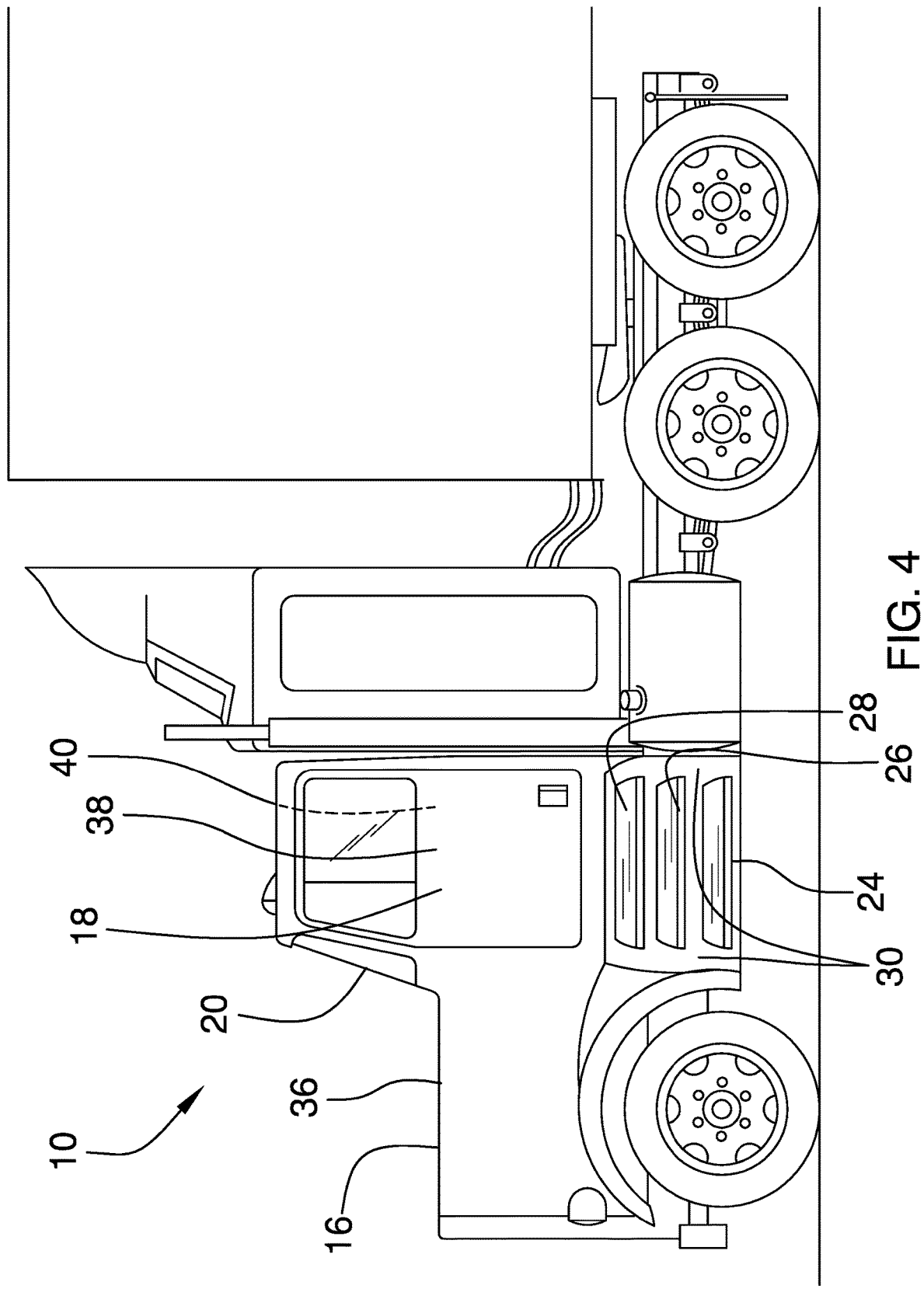
FIG. 4 is a side view of an embodiment of the disclosure.

The risers 28 are substantially height equivalent. Each step 22 is configured to withstand a vertical static load of at least 204 kilograms. The step fairing 12 is configured to be mountable to a respective side 14 of a cab over engine (COE) vehicle 36. For example, the step fairing 12 is configured to be mountable to a driver side 38 of a COE vehicle 36, as shown in FIG. 3, or to passenger side 40 of the COE vehicle 36 (not shown).

In use, step fairing 12 is mounted to a driver side 38 of a cab over engine vehicle 36 so that it is positioned beneath the door 18. The driver then can utilize the three steps 22 to enter and to exit the cab 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle cab access assembly comprising a step fairing configured to be mountable to a respective side of a vehicle, such that the step fairing is positioned below a door positioned in a cab of the vehicle, the step fairing comprising three steps, wherein the step fairing is configured for facilitating egress and ingress to the cab of the vehicle, a bottommost step of the three steps and a medial step of the three steps being vertically aligned, a topmost step of the three steps being inset towards the door relative to each of the bottommost step and the medial step.

2. The vehicle cab access assembly of claim 1, wherein each step comprises a pair of side panels, a tread rung, and a riser, the tread rung being grated or slotted, wherein the tread rungs are configured for slip resistance and prevention of accumulation of foreign materials.

3. The vehicle cab access assembly of claim 2, wherein:
the side panels and the risers comprising metal or plastic; and
the tread rungs comprising metal.

4. The vehicle cab access assembly of claim 2, wherein the step fairing is configured such that, upon mounting to the respective side of the vehicle, a bottommost tread rung is positioned no more than 609 millimeters above a surface upon which the vehicle is positioned.

5. The vehicle cab access assembly of claim 2, wherein:
each tread rung has a depth of at least 12.7 centimeters; and
each tread rung has a width of at least 25.4 centimeters.

6. The vehicle cab access assembly of claim 5, wherein:
the depths of the tread rungs are substantially equivalent; and
the widths of the tread rungs are substantially equivalent.

7. The vehicle cab access assembly of claim 2, wherein the risers are substantially height equivalent.

8. The vehicle cab access assembly of claim 1, wherein each step is configured for withstanding a vertical static load of at least 204 kilograms.

9. The vehicle cab access assembly of claim 1, wherein the step fairing is configured to be mountable to a respective side of a cab over engine vehicle.

10. The vehicle cab access assembly of claim 9, wherein the step fairing is configured to be mountable to a driver side or passenger side of a cab over engine vehicle.

11. A vehicle cab access system comprising:
a cab over engine vehicle; and
a step fairing mounted to a respective side of the cab over engine vehicle, such that the step fairing is positioned below a door positioned in a cab of the cab over engine vehicle, the step fairing comprising three steps, wherein the step fairing is configured for facilitating egress and ingress to the cab of the cab over engine vehicle, a bottommost step of the three steps and a medial step of the three steps being vertically aligned, a topmost step of the three steps being inset towards the door relative to each of the bottommost step and the medial step.

12. A vehicle cab access assembly comprising a step fairing configured to be mountable to a respective side of a vehicle, such that the step fairing is positioned below a door positioned in a cab of the vehicle, the step fairing comprising three steps, a bottommost step of the three steps and a medial step of the three steps being vertically aligned, a topmost step of the three steps being inset towards the door relative to each of the bottommost step and the medial step, wherein the step fairing is configured for facilitating egress and ingress to the cab of the vehicle, each step comprising a pair of side panels, a tread rung, and a riser, the tread rung being grated or slotted, wherein the tread rungs are configured for slip resistance and prevention of accumulation of foreign materials, the side panels and the risers comprising racial or plastic, the tread rungs comprising metal, the step fairing being configured such that, upon mounting to the respective side of the vehicle, a bottommost tread rung is positioned no more than 609 millimeters above a surface upon which the vehicle is positioned, each tread rung having a depth of at least 12.7 centimeters, the depths of the tread rungs being substantially equivalent, each tread rung having a width of at least 25.4 centimeters, the widths of the tread rungs being substantially equivalent, the risers being substantially height equivalent, each step being configured for withstanding a vertical static load of at least 204 kilograms, the step fairing being configured to be mountable to a respective side of a cab over engine vehicle, the step fairing being configured to be mountable to a driver side or passenger side of a cab over engine vehicle.

* * * * *